US007065122B2

(12) United States Patent
Yamamori et al.

(10) Patent No.: US 7,065,122 B2
(45) Date of Patent: Jun. 20, 2006

(54) WIRE-WOUND APPARATUS AND HIGH-VOLTAGE PULSE GENERATING CIRCUIT USING WIRE-WOUND APPARATUS

(75) Inventors: Kenji Yamamori, Oyama (JP); Toyoharu Inoue, Mitaka (JP)

(73) Assignee: USHIO Inc., Tokyo (JP)

( * ) Notice: Subject to any disclaimer, the term of this patent is extended or adjusted under 35 U.S.C. 154(b) by 254 days.

(21) Appl. No.: 10/369,772

(22) Filed: Feb. 21, 2003

(65) Prior Publication Data

US 2004/0022294 A1 Feb. 5, 2004

(30) Foreign Application Priority Data

Aug. 9, 2000 (JP) ............................ 2000-241476

(51) Int. Cl.
*H01S 3/03* (2006.01)
*H01S 3/97* (2006.01)

(52) U.S. Cl. .......................................... 372/87; 372/61

(58) Field of Classification Search ............. 372/38.02, 372/55; 336/206, 229, 213

See application file for complete search history.

(56) References Cited

U.S. PATENT DOCUMENTS

| | | | | |
|---|---|---|---|---|
| 3,720,897 | A * | 3/1973 | Feather et al. | 336/60 |
| 5,177,762 | A * | 1/1993 | Sato et al. | 372/66 |
| 5,717,373 | A * | 2/1998 | Vachris | 336/206 |
| 5,754,579 | A * | 5/1998 | Mizoguchi et al. | 372/58 |

* cited by examiner

*Primary Examiner*—James Vannucci
(74) *Attorney, Agent, or Firm*—Posz Law Group, PLC; R. Eugene Varndell, Jr.

(57) ABSTRACT

Electric field easing members (corona rings) for easing concentration of electric fields caused at edges of a core are disposed between the core and a winding to form a gap so to allow the presence of a cooling medium (insulating oil) between the top and bottom surfaces of the core and the electric field easing members. Thus, pressboards between the core and the electric field easing members become unnecessary, a wire-wound apparatus can be prevented from having a short service life due to the degradation of the pressboards, and the pressboards can be made to have a long service life because the electric field easing members are not heated by thermal conduction from the core.

12 Claims, 17 Drawing Sheets

WIRE-WOUND APPARATUS AND HIGH-VOLTAGE PULSE GENERATING CIRCUIT USING WIRE-WOUND APPARATUS

BACKGROUND OF THE INVENTION

1. Field of the Invention

The present invention relates to a wire-wound apparatus, such as a transformer or a reactor, which has a winding wound around a magnetic core and is used in an insulating cooling medium, and more particularly to a shape of an insulation easing member (hereinafter called as the corona ring) of such wire-wound apparatus.

The present invention can be applied to a saturable reactor, a step-up transformer or the like of a magnetic pulse compression circuit for generating a high-voltage pulse used for a discharge pumped laser, an apparatus for decomposing a compound by an electric discharge or sterilizing, or the like.

2. Description of the Related Art

A discharge pumped laser, a device for decomposing a compound such as dioxin by performing a pulse corona discharge, a pasteurizer for sterilizing food or the like by an electric discharge, or the like has discharging electrodes disposed within a discharge cell (chamber) and causes a discharge by applying a high-voltage pulse to the discharging electrodes. As a circuit for generating such a high voltage, a high-voltage pulse generating circuit using a magnetic compression circuit or the magnetic compression circuit and a step-up transformer circuit is generally known.

For example, the discharge pumped laser such as an excimer laser, a fluorine laser or the like oscillates pulse laser by repeatedly discharging between the discharging electrodes in a short time.

It is necessary to supply the discharging electrodes with a high voltage in a short time, and a high-voltage pulse generating circuit is disposed therefor. As a high-voltage pulse generating circuit for the discharge pumped laser, the aforesaid magnetic pulse compression circuit is generally used.

FIGS. 13(*a*) and 13(*b*) show configurations of general high-voltage pulse generating circuits disposed in a discharge pumped laser or the like. The configuration of FIG. 13(*a*) is an example including a two-stage magnetic pulse compression circuit using magnetic switches SR2, SR3 consisting of a saturable reactor, and the two-stage magnetic pulse compression circuit is indicated in a square of a dotted line in the drawing. FIG. 13(*b*) shows an example including a step-up transformer in addition to the above magnetic compression circuit, and a step-up transformer Tr is disposed instead of the reactor L1 of FIG. 13(*a*).

An operation of the high-voltage pulse generating circuit shown in FIG. 13(*a*) will be described. The operation of FIG. 13(*b*) is the same as that shown in FIG. 13(*a*) except that the voltage is increased by the step-up transformer Tr. Therefore, its description is omitted.

(1) An electric charge is charged from a high-voltage power supply (charger) to a capacitor C0 via the inductance L1.

(2) A switch SW is a semiconductor switch and, for example, an IGBT is used. When the semiconductor switch SW is closed to turn on, a current flows to a loop of the main capacitor C0, a magnetic switch SR1, the solid-state switch SW and a capacitor C1, and the electric charge of the capacitor C0 transfers to the capacitor C1.

(3) At the time, because a high voltage of 20 to 30 kV is applied to the charged capacitor C0, the same voltage is also applied to the semiconductor switch SW when the switch is turned on. A module of the semiconductor switch SW generally has a rated voltage of several kV, so that a plurality of modules of the semiconductor switch SW are connected in series to configure a switch circuit.

(4) When an integral value of a voltage of the capacitor C1 with time reaches a limit value which is determined according to the properties of a magnetic switch SR2, the magnetic switch SR2 is saturated, the current flows to a loop of the capacitor C1, a capacitor C2 and the magnetic switch SR2, and the electric charge of the capacitor C1 transfers to the capacitor C2. At this time, a pulse width of the current is compressed.

A compression ratio of the pulse width depends on the number of turns of a wire wound around the core of the magnetic switch SR2. Such a circuit is called a magnetic pulse compression circuit.

(5) Then, when an integral value of voltage V2 of the capacitor C2 with time reaches a limit value which is determined according to the properties of a magnetic switch SR3, the magnetic switch SR3 is saturated, the current flows to a loop of the capacitor C2, a peaking capacitor CP and the magnetic switch SR3, the electric charge of the capacitor C2 transfers to the peaking capacitor CP, and the peaking capacitor CP is charged. At this time, a pulse width of the current is compressed. A compression ratio of the pulse width depends on the number of turns of the wire wound around the core of the magnetic switch SR3.

(6) Voltage VP of the peaking capacitor CP increases as charging proceeds, and when the voltage VP reaches a given value Vb, laser gas between discharging electrodes E is undergone dielectric breakdown, and a main electric discharge is started. This main electric discharge excites a laser medium to generate a laser beam. Before the main electric discharge generates, the laser gas as the laser medium between the electrodes E is pre-ionized by unshown preionization means.

(7) Then, the voltage of the peaking capacitor CP is dropped sharply by the main electric discharge to resume the state before the start of charging.

(8) As the electric discharge operation is repeated by the switching operation of the semiconductor switch SW, pulse laser oscillation is performed at a prescribed repetition frequency.

(9) Here, when it is configured so that the inductance of a capacity migration circuit of each stage configured of the magnetic switch and the capacitor becomes smaller as the stages become near later stages, a pulse compression operation is performed to make the peak value of the current pulse flowing to each stage high sequentially and to make the pulse width sequentially narrow, and an intense electric discharge with a short pulse is realized between the electrodes E. Thus, a glow discharge is stably held between the discharging electrodes, stability of laser emission is enhanced, and an oscillation efficiency of laser is also improved.

In these years, the excimer laser used as an exposure light source is being demanded to perform high repetition discharging at several kHz for increasing a through put. To realize this, it is necessary that the switch SW performs high repetition switching operations. And, it is considered that the reduction of the pulse width by the magnetic pulse compression accelerates start-up of the discharge voltage and enables the high repetition.

FIGS. 14(*a*) and 14(*b*) schematically show circuit connection of the magnetic switches (i.e., saturable reactors) SR1 to SR3 and the step-up transformer Tr The saturable reactors SR1 to SR3 have a winding 2 wound around a magnetic core (hereinafter called the core) 1 which is grounded as shown in FIG. 14(*a*), and a high voltage is applied to the winding 2. The step-up transformer Tr has a primary winding 3 and a secondary winding 4 wound around the core 1 which is grounded as shown in FIG. 14(*b*), and when a high voltage is applied to the primary winding 3, a high voltage is generated in the secondary winding 4.

FIG. 15(*a*) is a perspective diagram showing a state that the winding 2 is wound around the core 1 of the saturable reactor (hereinafter called as the reactor). The core 1 has a magnetic alloy strip 1*b* wound around a core tube 1*a* in an annual ring shape. The core shown in the drawing has an annular ring shape but may have the form of a racetrack (oval-shape).

It is necessary to insulate between adjacent turns of the winding 2 and between the winding 2 and the core 1. The reactor to which a high voltage is applied is immersed in insulating oil for insulation and cooling. Therefore, crepe paper 2*b* having a good oleophilic property is wound as an insulating coating around a core wire 2*a* as shown in FIG. 15(*b*). The step-up transformer Tr also has the same configuration excepting that the primary winding and the secondary winding are wound around the core. Therefore, the reactor is mainly described below.

FIG. 16(*a*) is a diagram conceptually showing a sectional configuration of the above reactor. When a voltage is applied to the winding 2 which is wound around the core 1 having a substantially rectangular cross section as shown in FIG. 16(*a*), an electric field centers on the edges of the core 1.

This centering of the electric field may cause a corona discharge between the edge and the insulating coating of the winding 2 as shown in FIG. 16(*b*). When the corona discharge occurs, the insulating coating is damaged gradually, resulting in a short circuit in due course.

In order to prevent the corona discharge, an electric field easing member (hereinafter called as the corona ring) is generally disposed between the edges of the core 1 and the winding 2. FIG. 17 shows a sectional diagram of a fitting configuration of conventional corona rings 5 to the core 1 of the reactor The corona ring 5 is made of, for example, stainless steel and disposed along all the edges of the four corner of the core 1. Its cross section has an L shape fitting to the edge shape; however, if it has a sharp edge on the surface, an electric field concentrates on it and a corona discharge occurs. Therefore, it is configured to have a smooth curved structure as the whole to ease the electric field.

In FIG. 17, when a voltage is applied to the winding 2, a potential difference is produced in a horizontal direction of top surface A and bottom surface A' of the core 1. Specifically, the core 1 has a magnetic alloy strip, which has an insulating coating of silica or the like applied to its surface, wound around the core tube in an annual ring shape, and a winding direction of the strip has an electric resistance larger than that of the surface intersecting the winding direction at right angles. Therefore, when a voltage is applied to the winding 2, the potential difference is produced in the winding direction between the top surface A and the bottom surface A' of the core which are parallel to the winding direction of the strip. Meanwhile, surfaces B on the right and left sides intersecting the winding direction at right angles are held to have substantially the same potential.

Therefore, when conductive corona ring 5 comes into direct contact with the top surface A and the bottom surface A' of the core 1, a current flows to the corona ring due to the above-described potential difference. Thus, a magnetic flux is cancelled and an effective cross section of the core 1 becomes small Accordingly, to insulate the core 1 from the corona rings 5, pressboards 6 are placed on the top surface A side and the bottom surface A' side of the core 1 so to be held between the core 1 and the corona rings 5. The pressboard is formed by pressing multilayered oleophilic paper and generally used as an insulating material in insulating oil. Its thickness is for example 0.75 mm.

In addition, a thick pressboard 7 is placed on each of the corona rings 5 to surround the corona rings 5, and the winding 2 having crepe paper wound therearound is further wound over the pressboards 7.

Generally, a wire-wound apparatus such as a reactor or a step-up transformer generates heat from the core along with the loss of power. A heating value becomes high as the loss becomes large. A temperature increase in the core depends on the number of turns of the winding, a pulse width of a current (voltage) flowing through the winding and a repetition frequency and generally becomes high as these numerical values become larger.

For example, the magnetic switch of the magnetic pulse compression circuit in the discharge pumped laser is used under conditions that the core tends to have a high temperature because, as described above, high repeatability is required and it must be disposed in a small area by, e.g., superposing a plurality of reactors, for downsizing. In such a case, when used at a repetition frequency of 2 kHz for example, the edges of the core being used may have a temperature of 160° C. even when it is being cooled in the insulating oil.

In the configuration of the conventional example shown in FIG. 17, the core 1, the pressboards 6 and the corona rings 5 are closely contacted to each other. Therefore, the cooling medium (insulating oil) in which the reactor is immersed cannot reach between them to fully cool the edges of the core 1. Especially, the core 1 has the magnetic alloy strip, which has an insulating coating such as silica formed on its surface, wound on a core tube in an annual ring shape, so that it has poor thermal conduction in the winding direction of the strip. Therefore, the core portion having the pressboards 6 disposed on the top and bottom surfaces has a temperature higher than the other portions. This temperature increase drastically reduces the service life of the pressboard 6 held between the corona rings 5 and the core 1. The pressboard 6 has a service life of 20 to 30 years at 120° C. but is reported that its service life is halved for every 6.5° C. increase in its temperature.

Therefore, the pressboards 6 have a service life of approximately 3 to 6 months at 160° C. and decompose frequently, resulting in requiring replacement. The corona rings 5 are heated by thermal conduction from the core 1 and the pressboards 7 enclosing the corona rings 5 are also heated. Therefore, a service life of the pressboards 7 disposed on the corona rings 5 also becomes short.

As described above, the conventional wire-wound apparatus such as a reactor or a step-up transformer used for a high-voltage pulse generating circuit had a problem that the pressboard is deteriorated and its service life is shortened by heating.

The present invention was made to solve the above problem of the conventional art, and the object of the present invention is to provide a wire-wound apparatus which has a magnetic core having a magnetic alloy strip wound around a core tube, a winding wound around the magnetic core and used in an insulating cooling medium, wherein the service life of the wire-wound apparatus is increased by configuring to efficiently cool the magnetic core in the vicinity of an electric field easing member disposed at the edges of the magnetic core.

SUMMARY THE INVENTION

The present invention solves the above-mentioned problem as flows:

(1) In a wire-wound apparatus which has a magnetic core having a magnetic alloy strip wound around a core tube and a winding wound around the magnetic core and is used in an insulating cooling medium, electric field easing members for easing concentration of electric fields, which are caused at edges of the magnetic core, are disposed between the magnetic core and the winding; and a gap for allowing the presence of the cooling medium is provided at least between the electric field easing members and top and bottom surfaces of the magnetic core parallel to a winding direction of the magnetic alloy strip.

Thus, pressboards between the magnetic core and the electric field easing members become unnecessary, and the wire-wound apparatus can be prevented from having a short service life because of the degradation of the pressboards.

And, the magnetic core and the electric field easing members are in line contact with each other, and the electric field easing members and the magnetic core are configured not to contact, so that the electric field easing members can be prevented from having an increased temperature due to thermal conduction even if the core is heated, and the pressboards disposed between the electric field easing members and the winding can be prevented from having an increased temperature. Therefore, the pressboard can be prevented from having a shortened service life, and the wire-wound apparatus can be prevented from having a shortened service life because of the degradation of the pressboards.

(2) In a high-voltage pulse generating circuit including a magnetic compression circuit, or the magnetic compression circuit and a step-up transformer circuit, the wire-wound apparatus having the above-described configuration (1) is used for a saturable reactor or a step-up transformer disposed in the magnetic compression circuit.

(3) In a discharge pumped gas laser comprising a pair of laser discharging electrodes which are connected to output terminals of a high-voltage pulse generating circuit including a magnetic compression circuit or the magnetic compression circuit and a step-up transformer circuit and disposed within a laser chamber, and a peaking capacitor connected in parallel to the electrodes, the wire-wound apparatus having the configuration according to the above-described configuration (1) is used as a saturable reactor disposed in the magnetic compression circuit or as a step-up transformer of the step-up transformer circuit.

DETAILED DESCRIPTION OF THE PREFERRED EMBODIMENTS

Figure 1A:
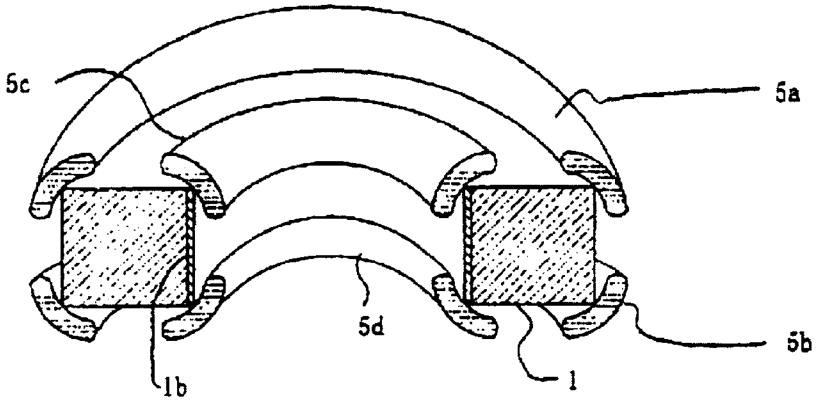
FIG. 1(*a*) to FIG. 1(*c*) are diagrams showing a first embodiment of the present invention.
Figure 1B:
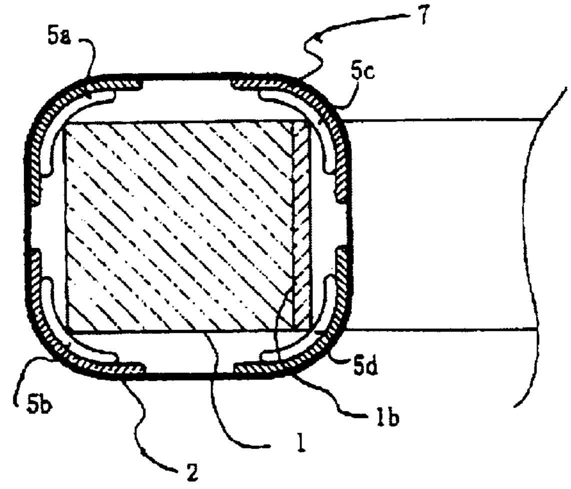
Figure 1C:
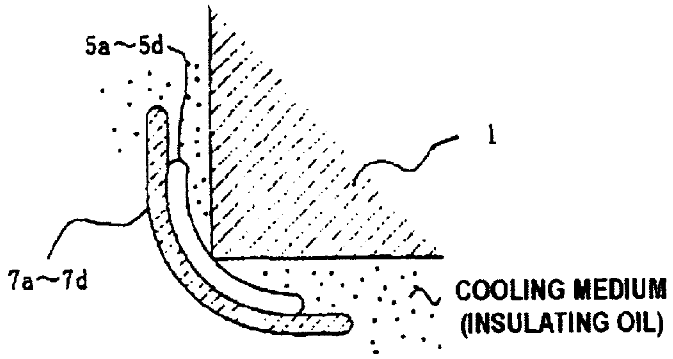
Figure 17:
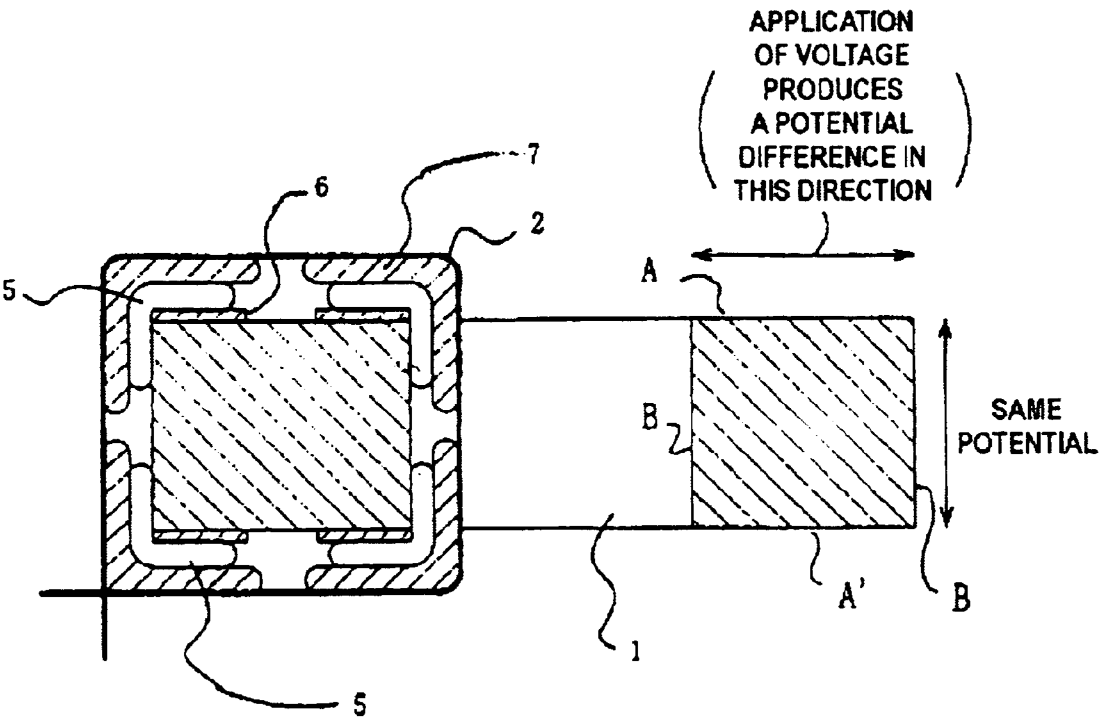
FIG.17 PRIOR ART
FIG. 17 is a sectional diagram showing a fitted state of conventional corona rings.

FIGS. 1(*a*) to 1(*c*) are diagrams showing the first embodiment of the present invention. FIG. 1(*a*) is a perspective diagram showing a relationship between a core and corona rings. To make it easy to see, it shows only a semicircular portion of the core, omitting a winding, the pressboards (the pressboards 7 of FIG. 17) enclosing the corona rings and others. And, FIG. 1(*b*) shows a sectional diagram of the core of this embodiment.

In this embodiment, corona rings 5*a* to 5*d* are disposed along four edges of the core 1 as shown in FIG. 1, the corona rings 5*a* to 5*d* have an arc cross section and are in line contact with the edges of the core 1.

As shown in FIG. 1(*b*), the pressboards 7 are disposed to enclose the corona rings 5*a* to 5*d*, the winding 2 is wound thereon, and the whole is immersed in the insulating oil as described above.

This embodiment configured as described above does not need to dispose an insulating pressboard (the pressboards 6 shown in FIG. 17) between the core 1 and the corona rings 5*a* to 5*d* because the corona rings 5*a* to 5*d* are not in contact with the core 1 excepting the edges of the core 1. Therefore, a life problem of the pressboards 6 between the core 1 and the corona rings 5*a* to 5*d* is eliminated.

As shown in FIG. 1(*c*), there is insulating oil between the corona rings 5*a* to 5*d* and the core 1, and the edges of the core 1 and the corona rings 5*a* to 5*d* can be cooled sufficiently. Besides, the core 1 and the corona rings 5*a* to 5*d* are in line contacted with each other, making it hard to conduct the temperature of the core 1 to the corona rings 5*a* to 5*d*.

Therefore, the corona rings 5*a* to 5*d* can be prevented from being heated, so that the temperatures of the pressboards 7*a* to 7*d* disposed to enclose the corona rings 5*a* to 5*d* can be kept low, and the pressboards can be made to have a long service life.

Figure 2:
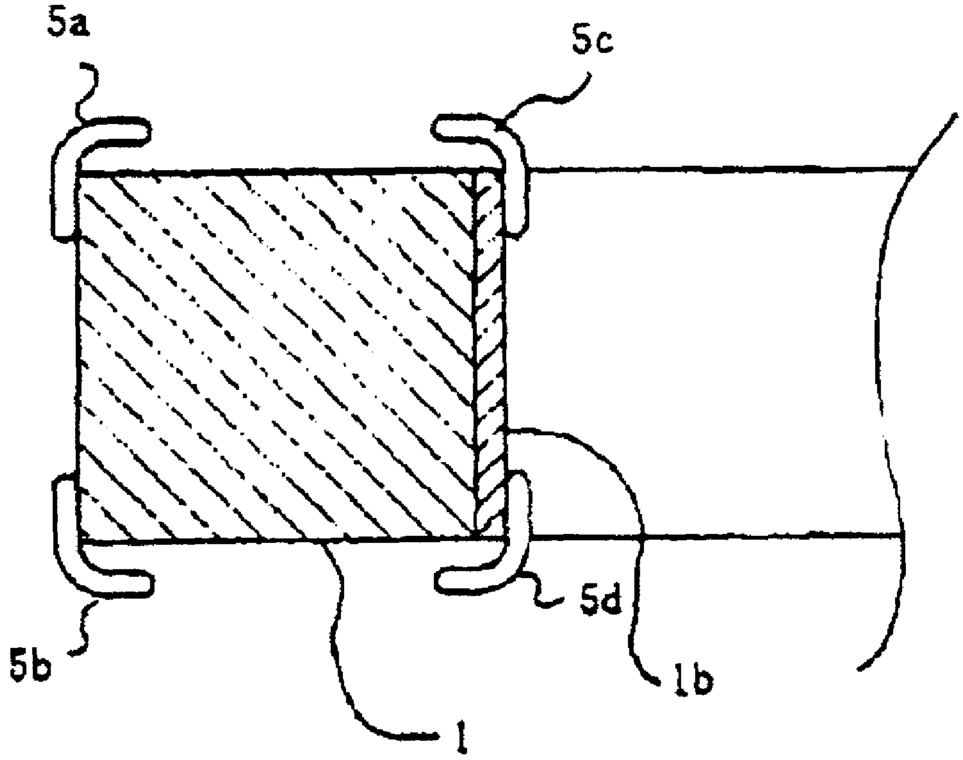
FIG. 2 is a diagram showing a modified embodiment of the first embodiment.

In the above embodiment, the corona rings 5*a* to 5*d* and the core 1 are in line contact, but a gap may be formed between the corona rings 5*a* to 5*d* and the top and bottom surfaces of the core 1 as shown in FIG. 2 to have the side faces of the core 1 in surface contact with the corona rings. This configuration eliminates the necessity of the pressboards 6 and can prevent the pressboards 5 from having a short service life because of heating. And, the side faces of the core 1 have relatively good thermal conduction, so that the core 1 can be prevented from being heated even if the corona rings 5*a* to 5*d* are in surface contact with it.

In the above embodiment, the annular ring core was described, but this embodiment may be applied to a racetrack-shape core to be described later.

The core which has the magnetic alloy strip wound around the core tube in the annual ring shape can be formed to have a desired inside diameter by selecting a size of the core tube. But, the outside diameter of the core is not always a desirable one because the strip is wound around the core and variable depending on the core.

Figure 3A:
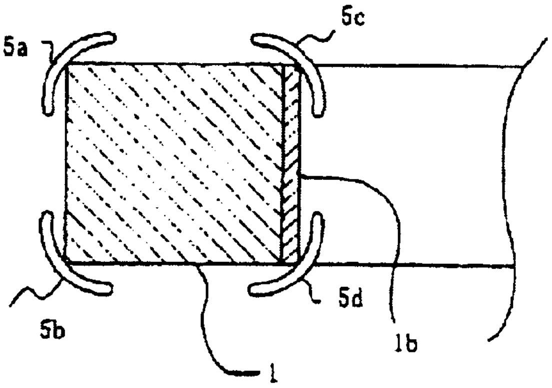
FIGS. 3(*a*) to 3(*c*) are diagrams illustrating relative positional relationships between the corona rings and the core when the core 1 has variation in its outside diameter, FIG. 3(*a*) showing the core having an appropriate outside diameter, FIG. 3(*b*) showing the core having a small outside diameter, and FIG. 3(*c*) showing the core having a large outside diameter.
Figure 3B:
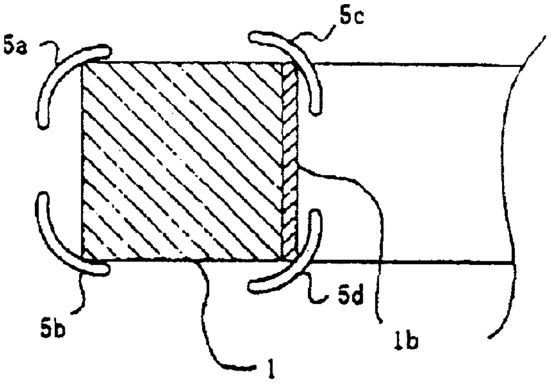
Figure 3C:
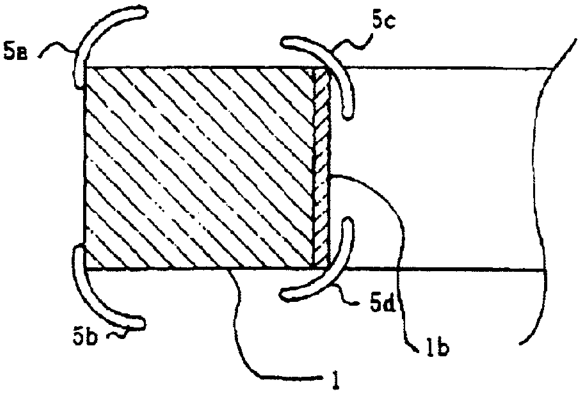

If the outside diameter of the core 1 is variable, the relative positional relationship between the corona rings 5*a*, 5*b* and the core 1 is variable depending on the size of the core 1 as shown in FIG. 3(*a*) to FIG. 3(*c*) when the corona rings 5*a*, 5*b* have a prescribed diameter, desired insulating performance cannot be secured or an appropriate gap may not be formed between the core 1 and the corona rings 5*a*, 5*b*. To deal with such a drawback, the inside diameters of the corona rings 5*a*, 5*b* fitted to the outside of the core are formed to be larger to some extent considering variations of the outside diameter of the core, the core 1 and the corona rings 5*a*, 5*b* are not in line contact with each other as shown in FIG. 1, but the corona rings 5*a*, 5*b* and the edges of the core 1 may not be contacted with each other as shown in FIG. 4(*a*) and FIG. 4(*b*) by supporting the corona rings 5*a*, 5*b* with a supporting member.

Figure 4A:
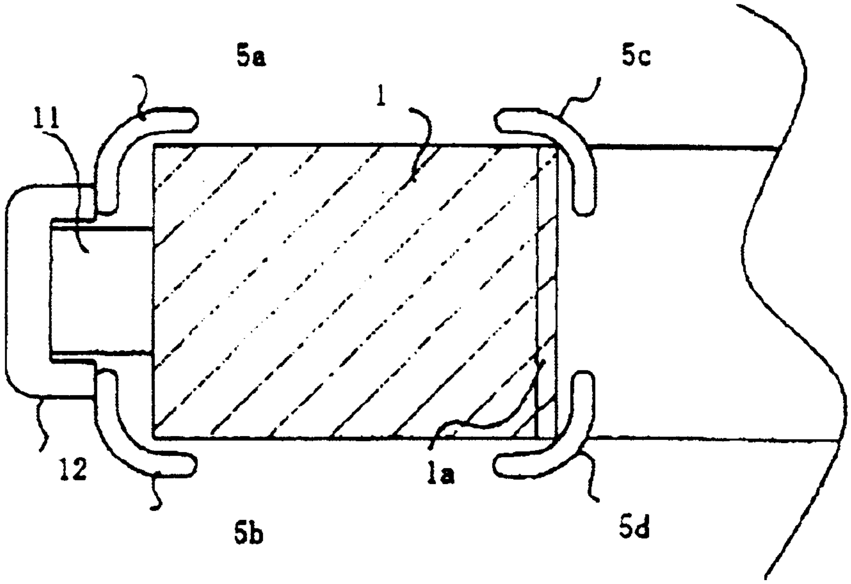
FIGS. 4(*a*) and 4(*b*) are diagrams illustrating attachment of the corona rings when the corona rings and the core are configured not to contact to each other.
Figure 4B:
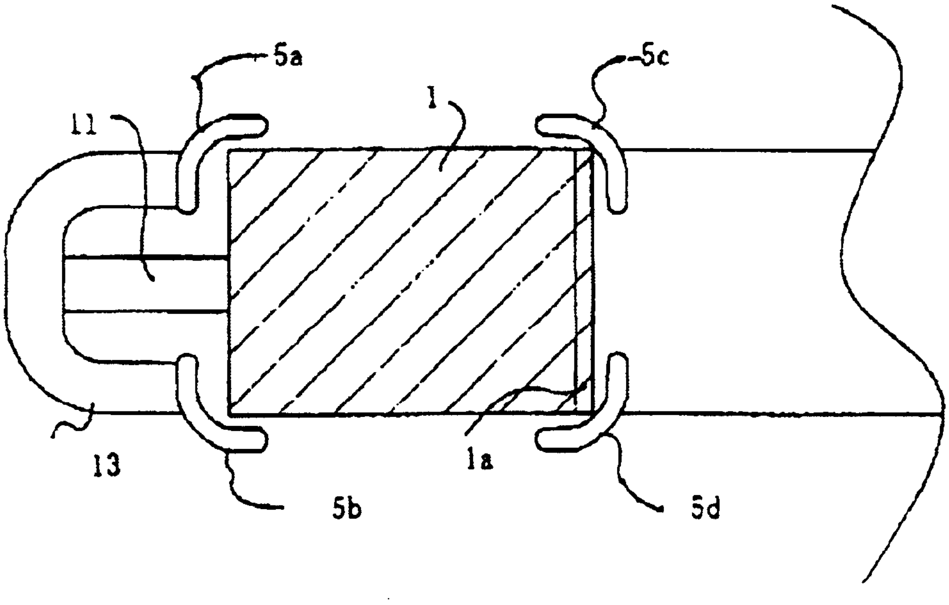

FIG. 4(*a*) shows that a holding member 12 is mounted on a boss 11 which is fitted to the core 1 to push and hold the corona rings 5*a*, 5*b* against the core 1 by the holding member 12. FIG. 4(*b*) shows that the top corona ring 5*a* and the bottom corona ring 5*b* are coupled by an arm 13, which is fixed to the boss 11 fitted to the core 1. FIG. 4(*b*) is applied to supporting of two-split type corona rings to be described later. In FIG. 4(*a*) and FIG. 4(*b*), the pressboards 7, the winding 2 and others are omitted.

By configuring as described above, thermal conduction from the core 1 to the corona rings 5*a*, 5*b* can be eliminated, so that the corona rings can be farther prevented from a temperature increase.

Then, a specific example of configuration of the fitted corona rings shown in FIG. 4(*a*) and FIG. 4(*b*) will be described.

Figure 5:
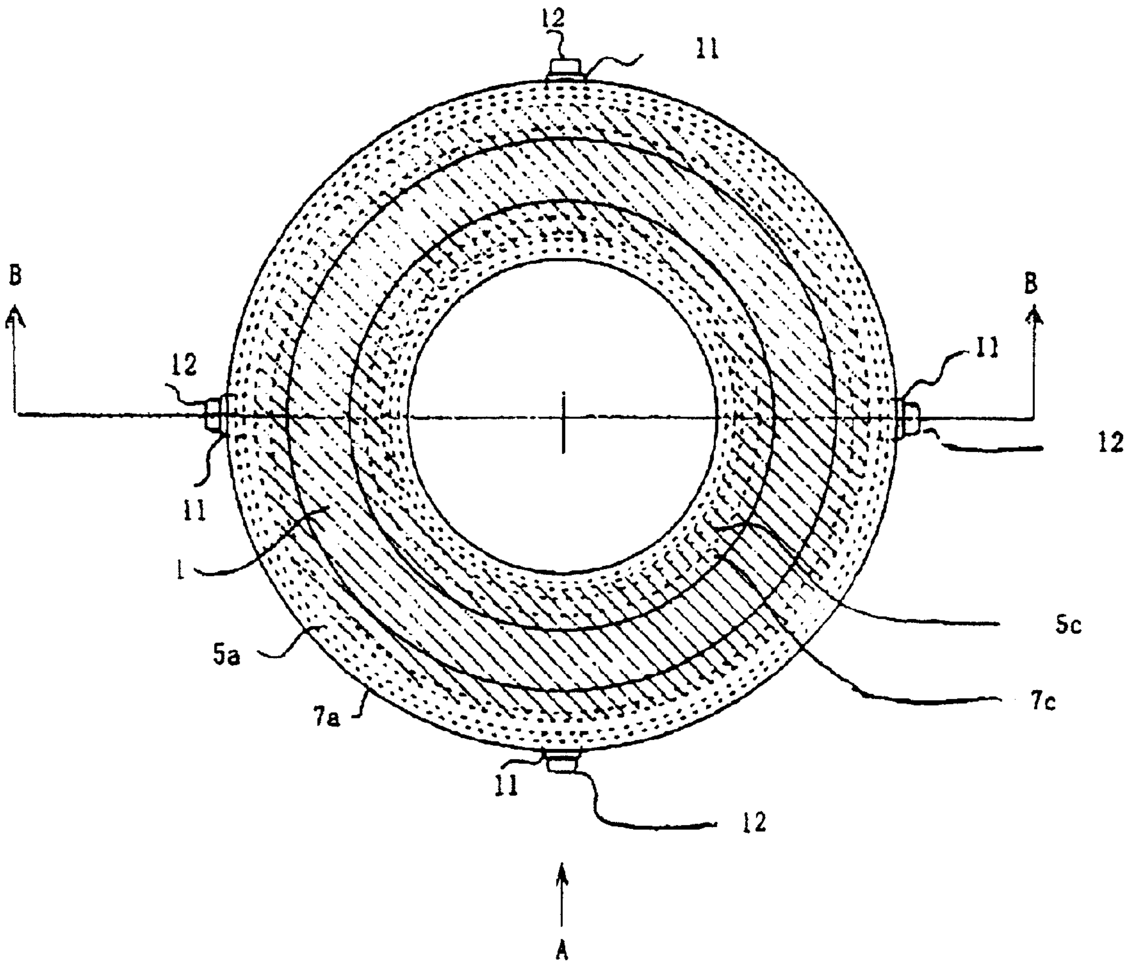
FIG. 5 is a diagram (1) showing a second embodiment of the present invention.
Figure 6A:
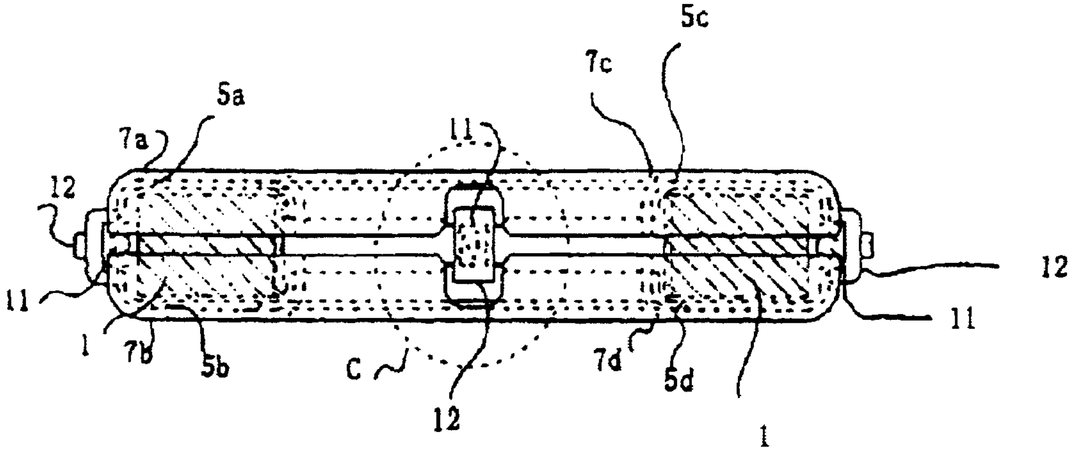
FIGS. 6(*a*) and 6(*b*) are diagrams (2) showing the second embodiment of the present invention.
Figure 6B:
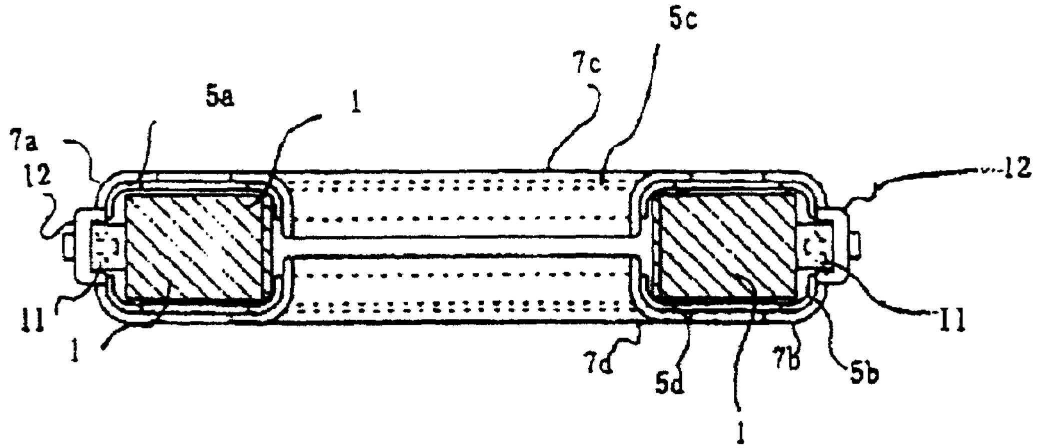
Figure 7A:
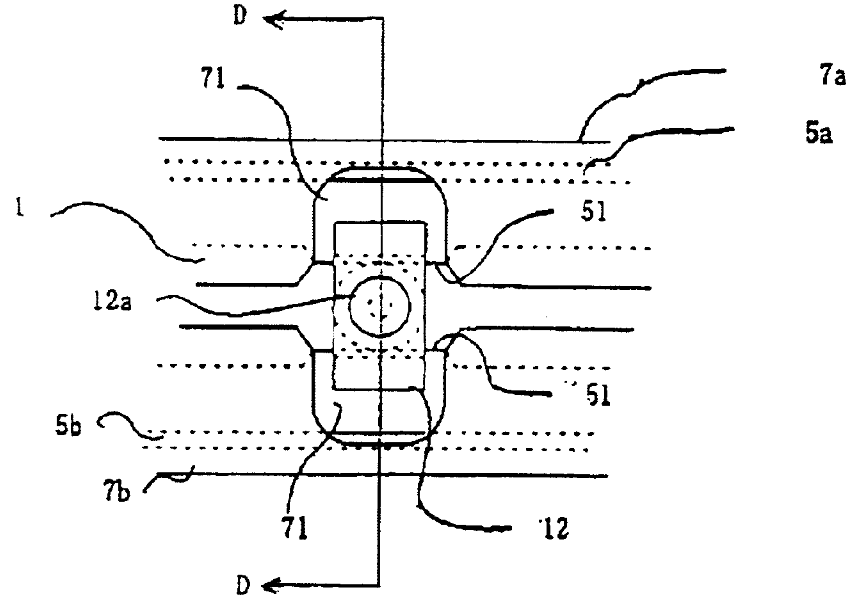
FIGS. 7(*a*) and 7(*b*) are partially enlarged diagrams of FIG. 6(*a*) and FIG. 6(*b*)
Figure 7B:
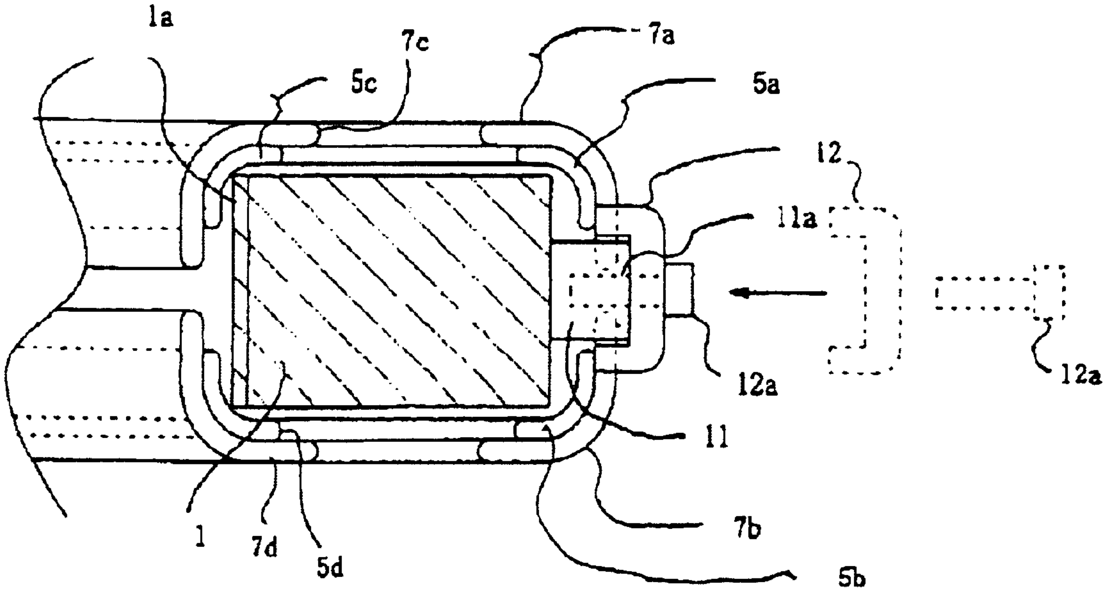

FIG. 5, FIGS. 6(*a*) and 6(*b*), and FIGS. 7(*a*) and 7(*b*) are diagrams showing the second embodiment of the present invention. This embodiment shows an example of configuration that an annular ring-shape corona ring which is not split is fitted to the annular ring core with a winding omitted from the drawings FIG. 5 is a diagram showing the core of this embodiment viewed from above, FIG. 6(*a*) is a diagram viewing FIG. 5 from direction A, FIG. 6(*b*) is a sectional diagram taken along fine B—B of FIG. 5, FIG. 7(*a*) is an enlarged diagram of portion C of FIG. 6(*a*), and FIG. 7(*b*) is a sectional diagram taken along line D—D of FIG. 7(*a*).

In FIG. 5, FIG. 6 and FIG. 7, 1 denotes a core, and the core 1 is a core having the magnetic alloy strip wound around the annular ring-shape core tube in an annual ring shape. And, a boss 11 is fitted at four points on the periphery of the core 1 to fix the corona rings.

Reference numerals 5*a* to 5*d* denote corona rings, and 7*a* to 7*d* denote pressboards. The corona rings 5*a* and 5*b* are fitted to the outside of the core 1, and the corona rings 5*c* and 5*d* are fitted to the inside of the core 1. As shown in FIG. 1 and FIG. 4, the corona rings 5*c*, 5*d* are in line contact with the core tube 1*a* of the core 1, and the pressboards 7*c*, 7*d* are fitted to enclose the corona rings 5*c*, 5*d*.

The corona rings 5*a*, 5*b* are not in contact with the core 1 but pushed against the boss 11 by a holding member 12 fixed to the boss 11 by a screw or the like. The pressboards 7*a*, 7*b* are fitted to enclose the corona rings 5*a*, 5*b*.

The boss 11 is fitted at four points on the periphery of the core 1, and a notch 71 is formed in the pressboards 7*a*, 7*b* to correspond to the boss 11 as shown in FIG. 7(*a*). A projection 51 extending toward the boss 11 is disposed on the corona rings 5*a*, 5*b* to correspond to the boss 11 And, a screw hole 11*a* is formed in the boss 11 as shown in FIG. 7(*b*).

To attach the corona rings 5*a*, 5*b*, the corona rings 5*a*, 5*b* are fitted to the core 1, and the holding member 12 is attached to the boss 11 with a screw 12*a* in such a way that both ends of the holding member 12 having a U shape come into contact with the projections 51 of the corona rings 5*a*, 5*b* as shown in FIG. 7(*b*). Then, a clamping amount of the holding member 12 attached to the bosses 11 which are attached to the four points on the periphery of the core 1 is adjusted to have a prescribed value of gap between the core 1 and the corona rings 5*a*, 5*b*.

After the corona rings 5*a* to 5*d* are attached and the pressboards 7*a* to 7*d* are attached to enclose them as described above, a winding is wound around the pressboards 7*a* and 7*d* avoiding the bosses 11.

Figure 8:
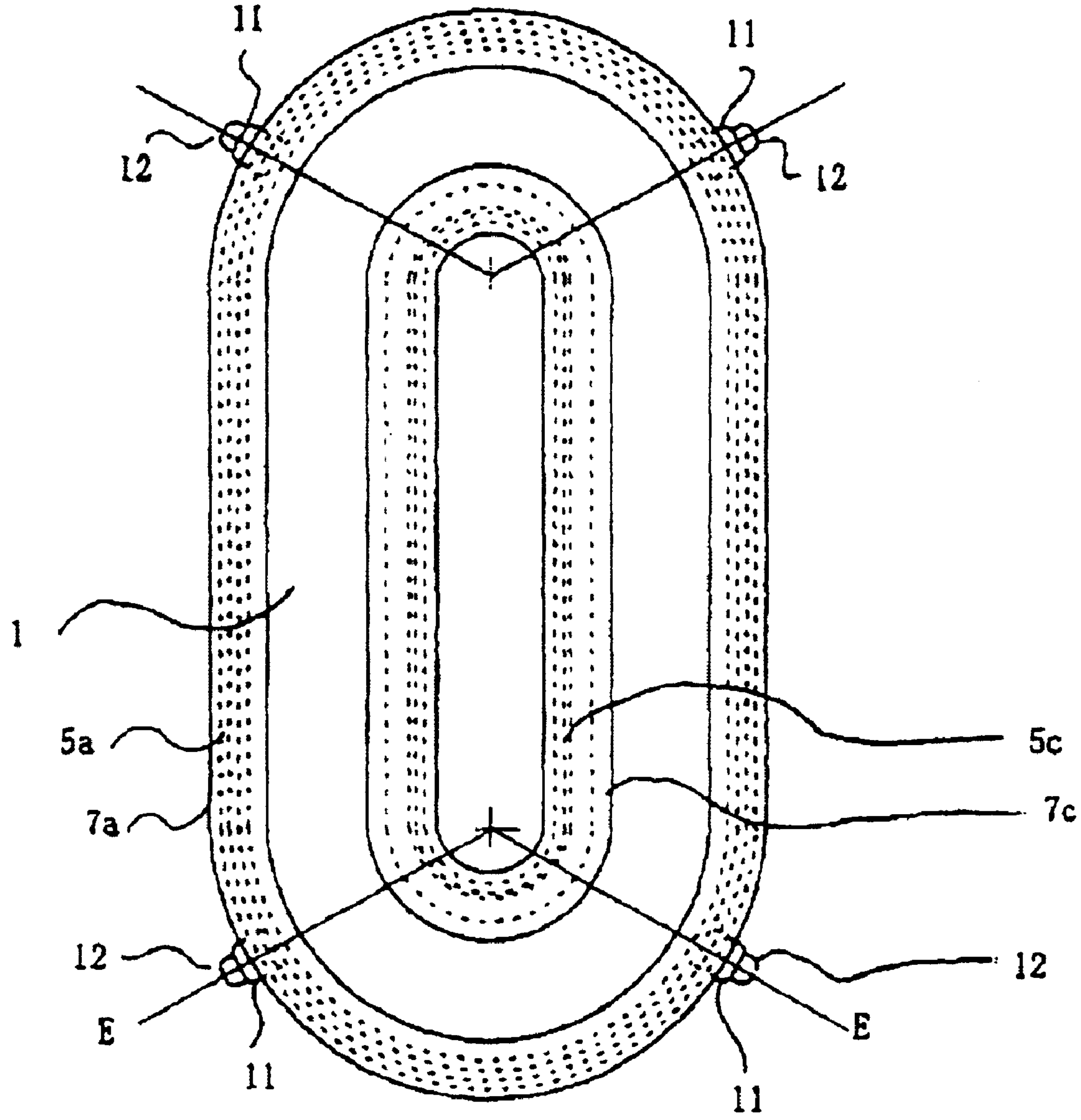
FIG. 8 is a diagram showing a third embodiment of the present invention.

FIG. 8 shows the third embodiment of the present invention. This embodiment shows that the second embodiment is applied to the core having a racetrack shape (oval-shape). FIG. 8 shows a top view of the core (corresponding to FIG. 5), wherein the winding is omitted in the same manner as in FIG. 5, FIG. 6 and FIG. 7.

In FIG. 8, 1 denotes a core, and the core 1 has the magnetic alloy strip wound around a racetrack-shape core tube in an annual ring shape as described above. A boss 11 is attached to four points on the periphery of the core 1 to fix the corona rings. And, 5*a* and 5*c* denote corona rings, and 7*a*, 7*c* denote pressboards. The corona ring 5*c* is in line contact with the core tube la of the core 1 as shown in FIG. 1 and FIG. 4, and the pressboard 7*c* is attached to enclose the corona ring 5*c* (the corona ring 5*d* and the pressboard 7*d* not shown in the drawing are also the same).

The corona ring 5*a* is not in contact with the core 1 in the same way as in FIG. 5 and FIG. 8 and pushed to the boss 11 and fixed by the holding member 12 which is fixed to the boss 11 with a screw or the like. The pressboard 7*a* is attached to the corona ring 5*a* to cover it (the corona rings 5*b* and pressboard 7*b* not shown in the drawing are also the same).

In FIG. 8, the fitting configuration of the corona ring 5*a* by the holding member 12 is the same as in FIG. 5 and FIG. 7, and the sectional diagram taken along line E—E of FIG. 8 is the same as that of FIG. 6(*b*).

Figure 9:
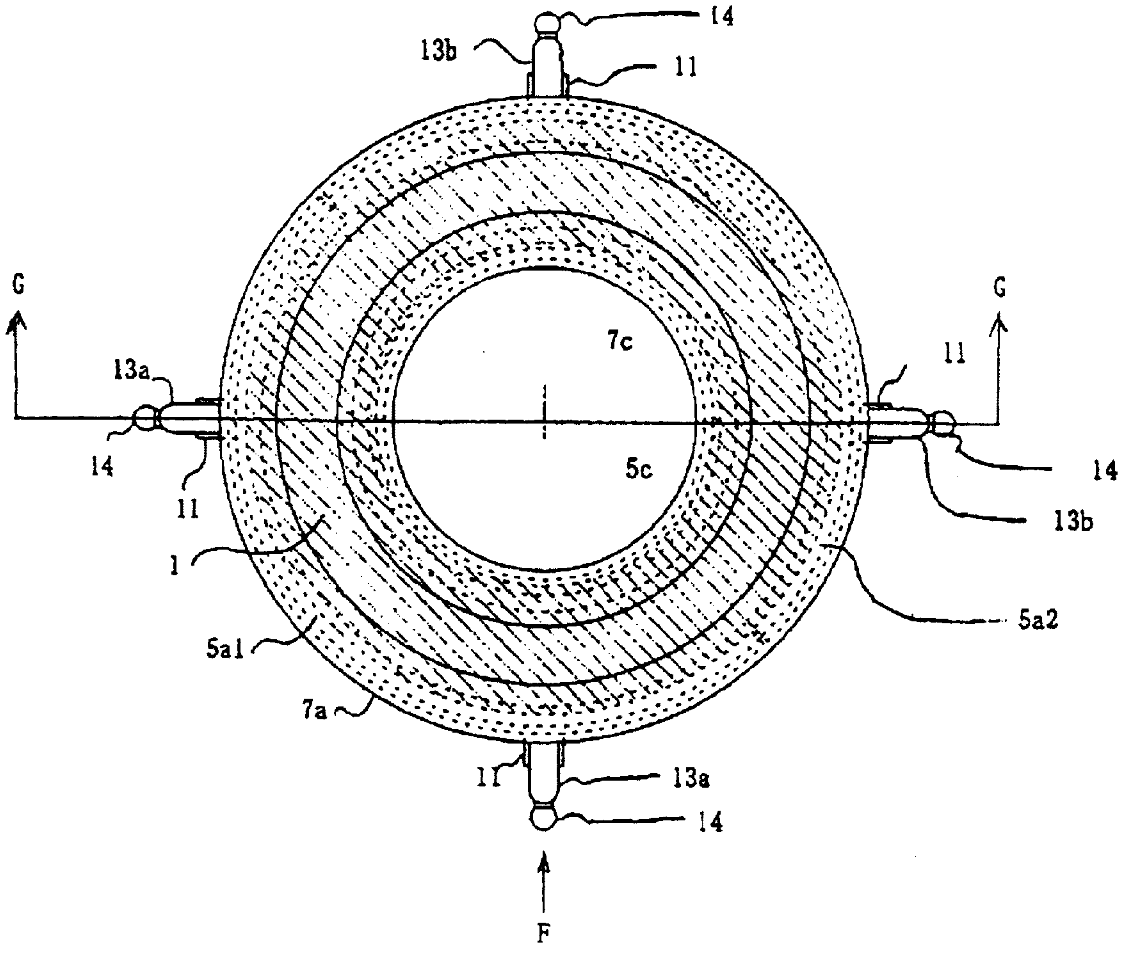
FIG. 9 is a diagram (1) of a fourth embodiment of the present invention.
Figure 10A:
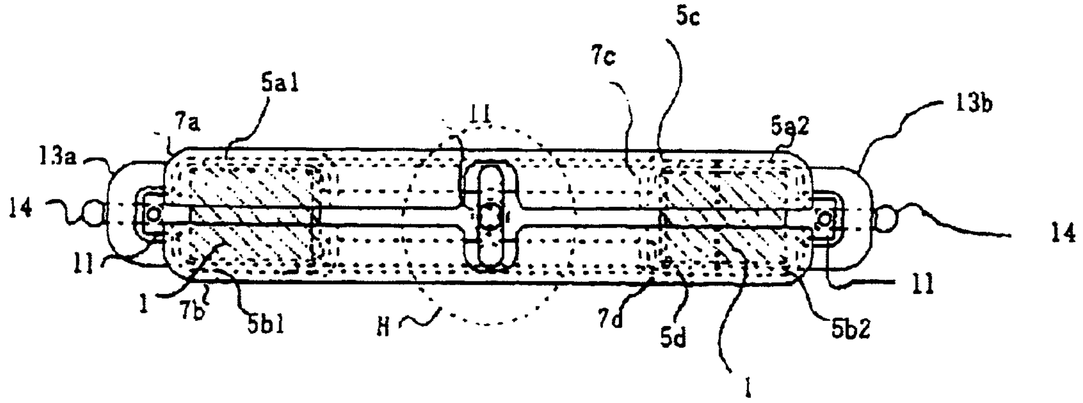
FIGS. 10(*a*) and 10(*b*) are diagrams (2) showing the fourth embodiment of the present invention.
Figure 10B:
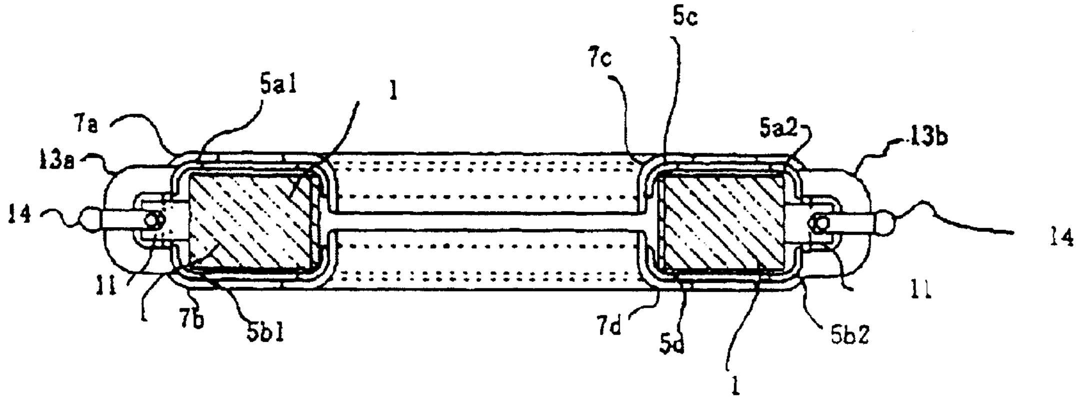
Figure 11A:
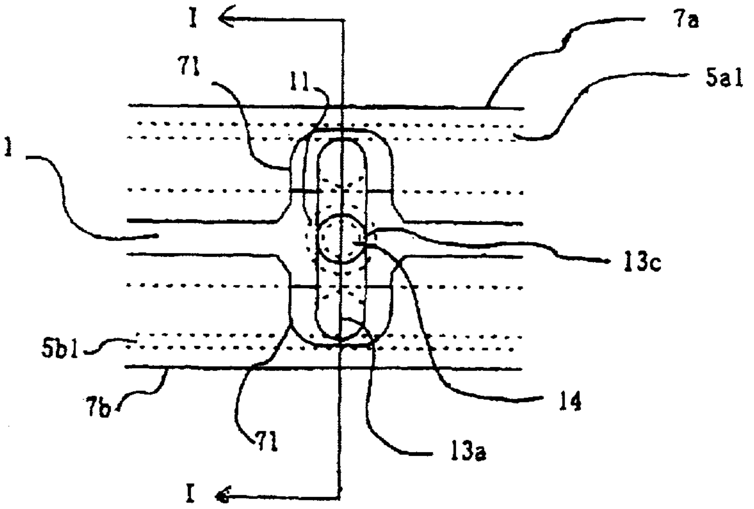
FIGS. 11(*a*) and 11(*b*) are partially enlarged diagrams of FIG. 10.
Figure 11B:
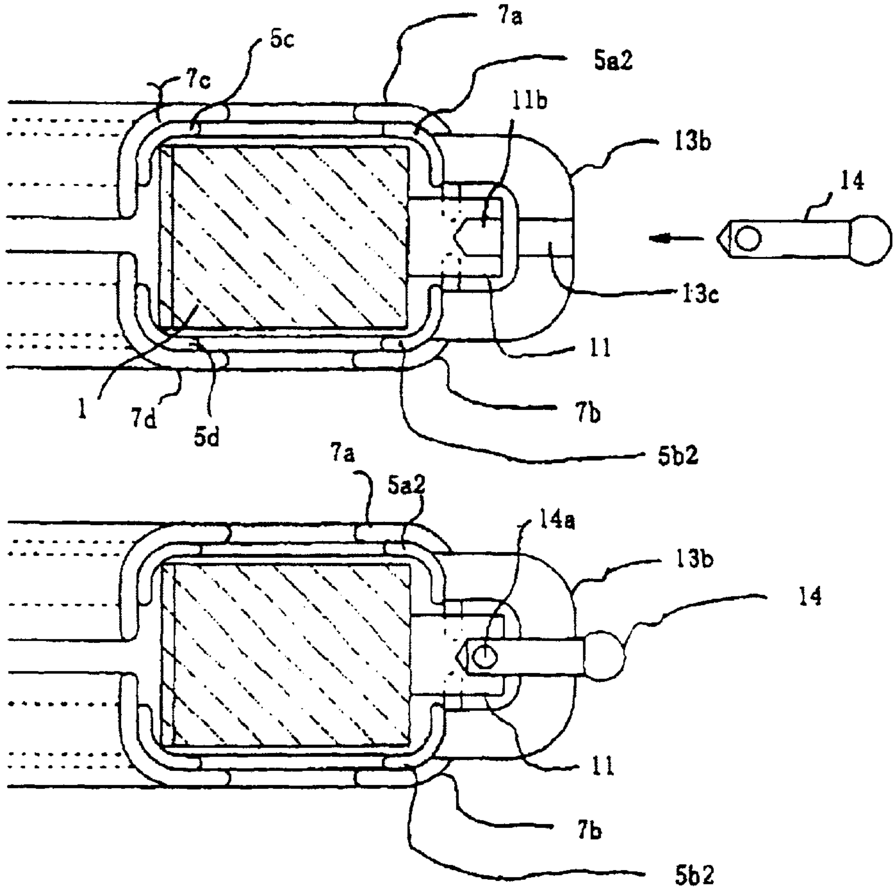

FIG. 9, FIG. 10 and FIG. 11 show the fourth embodiment of the present invention. This embodiment shows an example configuration of fitting two-split annular ring-shape corona rings to an annular ring core, wherein a winding is omitted.

FIG. 9 is a diagram of the core of this embodiment viewed from above, FIG. 10(*a*) is a diagram viewing FIG. 9 from direction F. FIG. 10(*b*) is a sectional diagram taken along line G—G of FIG. 9(*a*), and FIG. 11(*a*) is an enlarged diagram of portion H of FIG. 10(*a*). FIG. 11(*b*) shows a sectional diagram taken along line I—I of FIG. 11(*a*), wherein the upper part diagram shows a state that an arm for coupling the corona rings is not fixed to the boss, and the lower part diagram shows a state that the arm is fixed to the boss.

In FIG. 9, FIG. 10 and FIG. 11, reference numeral 1 denotes a core. The core 1 is a core having the magnetic alloy strip wound around the annular ring-shape core tube in an annual ring shape as described above, and a boss 11 is fitted at four points on the periphery of the core 1 to fix the corona rings.

Reference numerals 5*c*, 5*d* denote corona rings attached to the inside of the core 1. The corona rings 5*c*, 5*d* are in line contact with the core tube 1*a* of the core 1 as shown in FIG. 1 and FIG. 4, and pressboards 7*c*, 7*d* are attached to enclose the corona rings 5*c*, 5*d*.

The corona rings attached to the outside of the core are split into two parts and consist of corona rings 5*a*1, 5*a*2 attached to the top of the core 1 and corona rings 5*b*1, 5*b*2 attached to the bottom of the core 1. Meanwhile, the pressboard is not split and consists of a pressboard 7*a* attached to the top of the core 1 and a pressboard 7*b* attached to the bottom of the core 1.

The corona rings 5*a*1, 5*b*1 are coupled by an arm 13*a*, and the corona rings 5*a*2, 5*b*2 are coupled by an arm 13*b*. These corona rings 5*a*1 to 5*b*2 are not in contact with the core 1 and supported by fixing the arms 13*a*, 13*b* to the boss 11 by a mounting member 14.

The pressboards 7*a*, 7*b* are attached to the corona rings 5*a*1, 5*a*2, 5*b*1, 5*b*2 to enclose them.

The boss 11 is attached to four points on the periphery of the core 1, and a notch 71 is formed in the pressboards 7*a*, 7*b* to correspond to the boss 11 as shown in FIG. 11(*a*). And, a through hole 13*c* is formed in the arms 13*a*, 13*b* to correspond to the boss 11 and a hole 11*b* is formed in the boss 11 as shown in FIG. 11(*a*), FIG. 11(*b*).

To attach the corona rings 5*a*1 to 5*b*2 to the core 1, the corona rings 5*a*1, 5*b*1 coupled by the arm 13*a* and the corona rings 5*a*2, 5*b*2 coupled by the arm 13*b* are fitted to the core 1, and the mounting member 14 is inserted into the hole 11*b* formed in the boss 11 through the through hole 13*c* formed in the arms 13*a*, 13*b* as shown in FIG. 11(*b*). And, the mounting member 14 is fixed to the boss 11 with a pin 14*a* or the like. Thus, the corona rings 5*a*1 to 5*b*2 are fitted to the core 1.

The corona rings 5*a*1 to 5*b*2, 5*c*, 5*d* are attached to the core 1 as described above, the pressboards 7*a* to 7*d* are attached to enclose them, and a winding is wound around the pressboards 7*a*, 7*b*, 7*c*, 7*d* avoiding the bosses 11.

Figure 12:
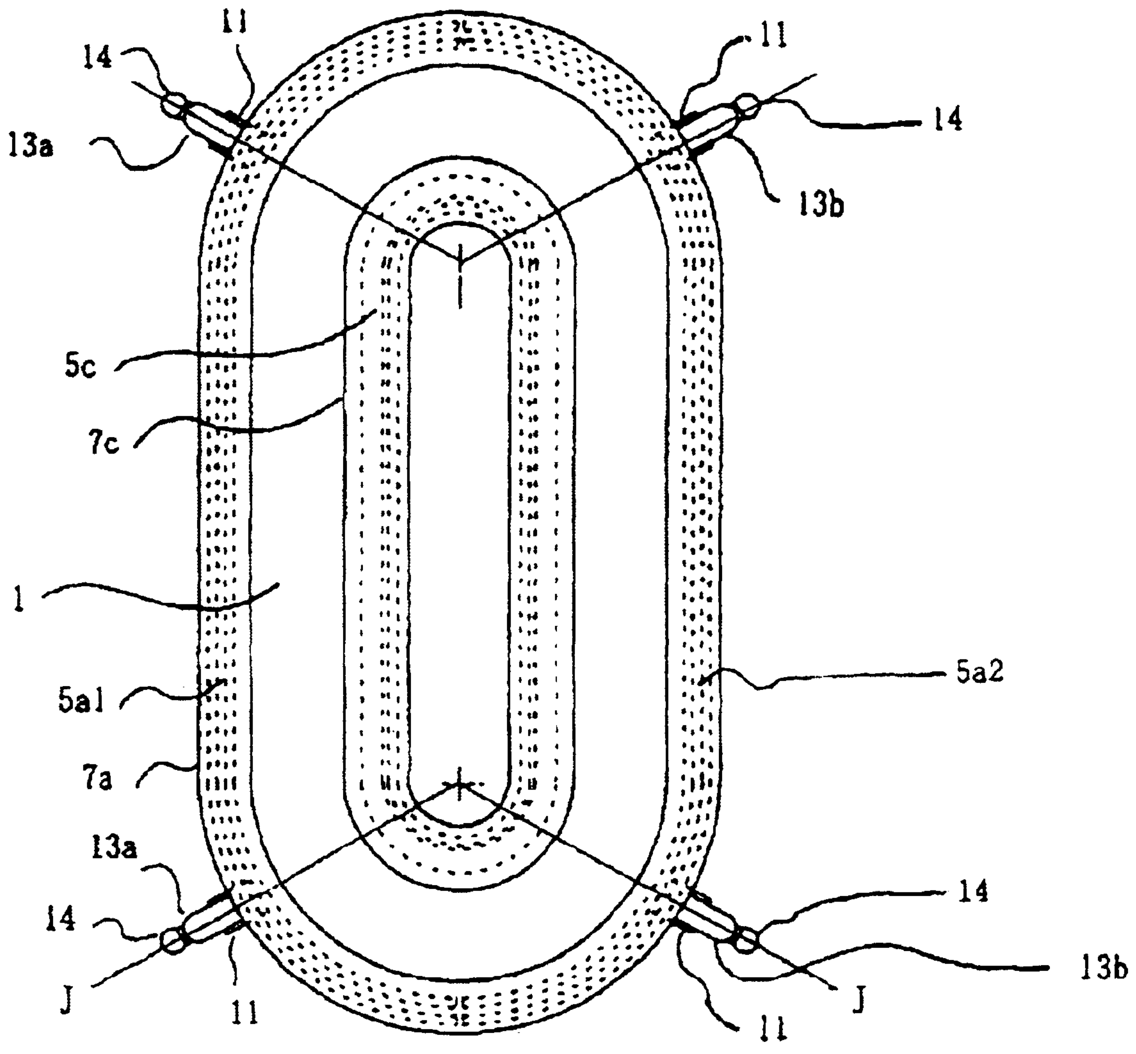
FIG. 12 is a diagram showing a fifth embodiment of the present invention.
Figure 13A:
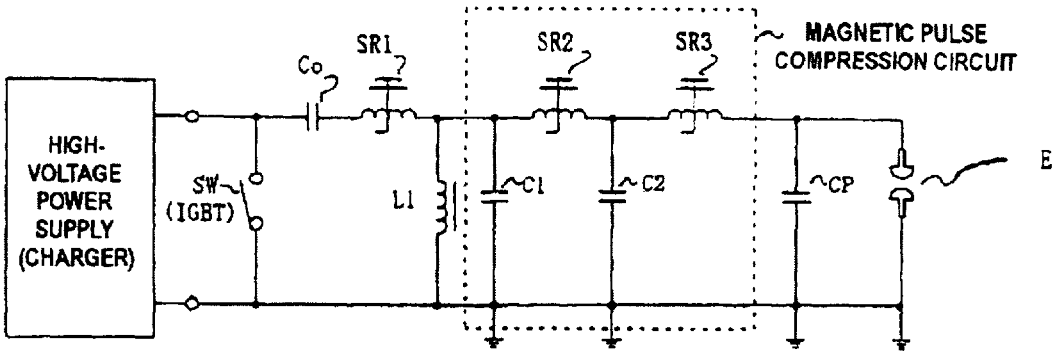
FIG.13(a) PRIOR ART
FIGS. 13(*a*) and 13(*b*) are diagrams showing configurations of a general high-voltage pulse generating circuit.
Figure 13B:
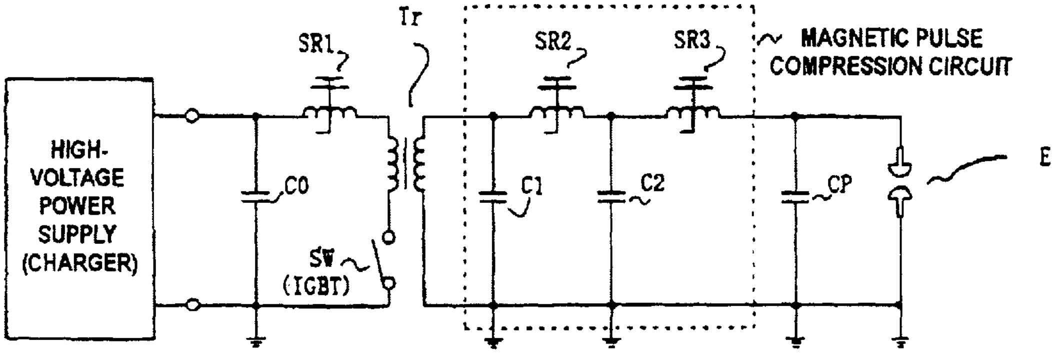
FIG.13(b) PRIOR ART
Figure 14A:
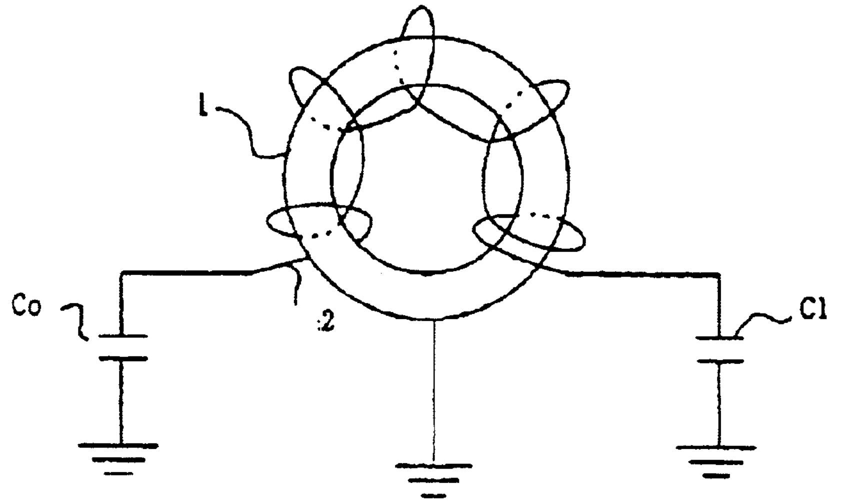
FIG.14(a) PRIOR ART
FIGS. 14(*a*) and 14(*b*) are diagrams schematically showing circuit connection of a magnetic switch and a step-up transformer.
Figure 14B:
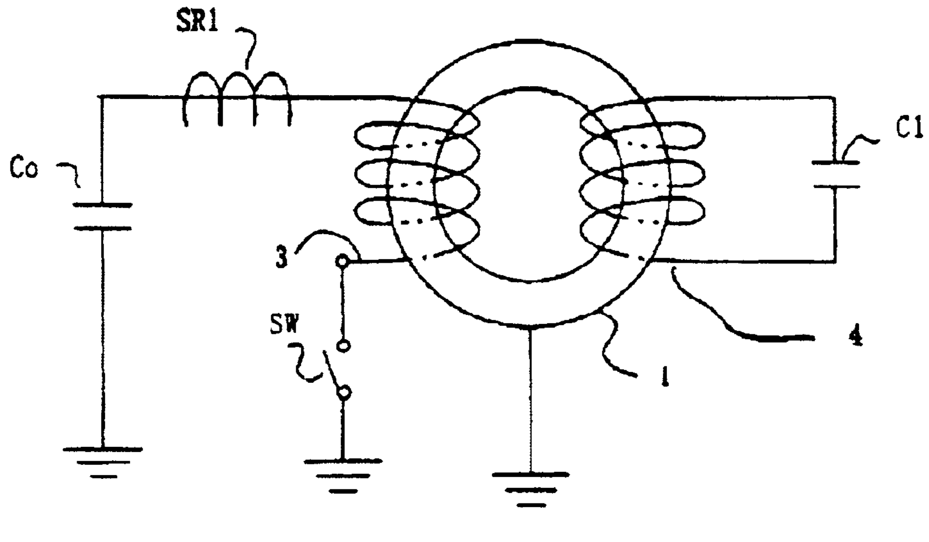
FIG.14(b) PRIOR ART
Figure 15A:
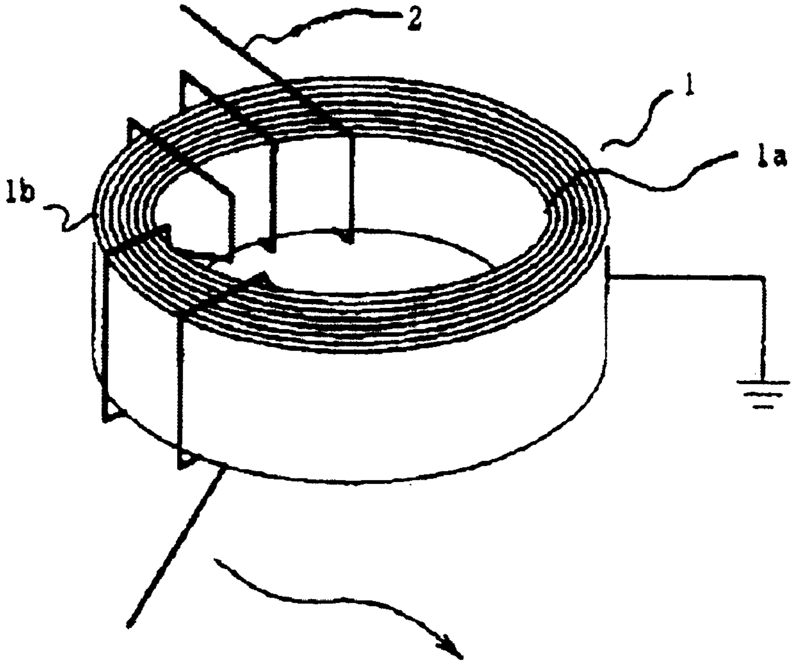
FIG.15(a) PRIOR ART
FIGS. 15(*a*) and 15(*b*) are perspective diagrams each showing a winding wound around a saturable reactor core.
Figure 15B:
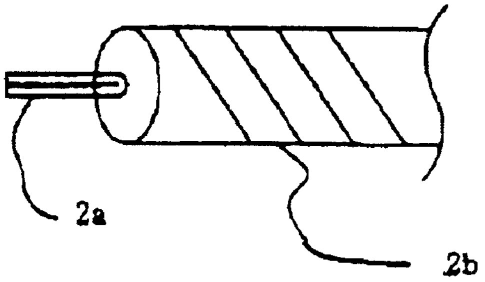
FIG.15(b) PRIOR ART
Figure 16A:
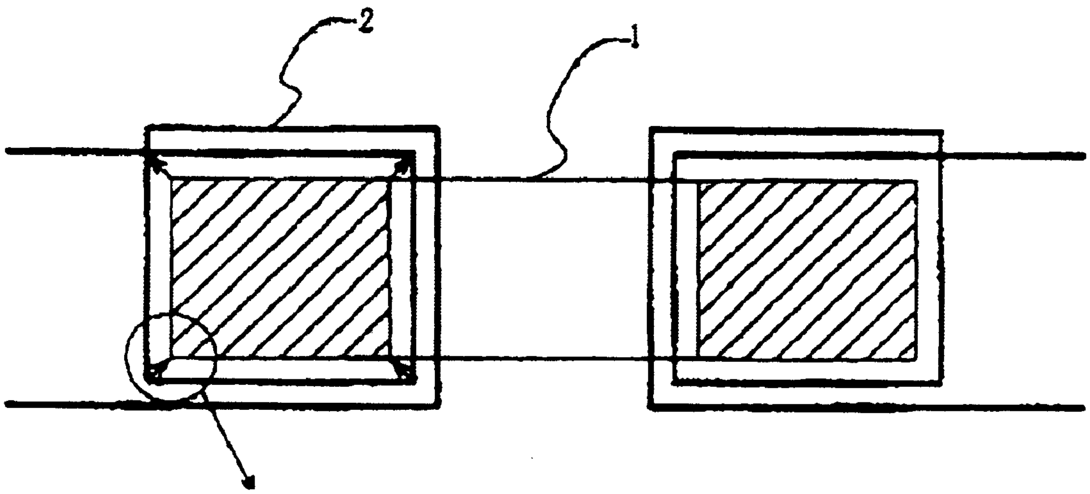
FIG.16(a) PRIOR ART
FIGS. 16(*a*) and 16(*b*) are diagrams conceptually showing a sectional structure of the saturable reactor.
Figure 16B:
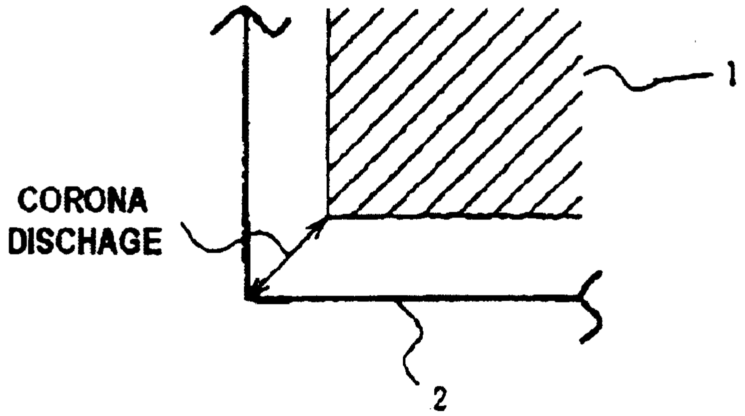
FIG.16(b) PRIOR ART

FIG. 12 shows the fifth embodiment of the application of the fourth embodiment to a racetrack-shape (oval-shaped) core. It is a top view of the core (corresponding to FIG. 9), and a winding is omitted.

In FIG. 12, 1 denotes a core, and the core 1 has a magnetic alloy strip wound around the racetrack-shape core tube in an annual ring shape as described above, and a boss 11 is attached to four points of the periphery of the core 1 to fix the corona rings Reference numeral 5*c* denotes a corona ring attached to the inside of the core 1. The corona ring 5*c* is in line contact with the core tube 1*a* of the core 1 as shown in FIG. 1 and FIG. 4, and a pressboard 7*c* is attached to enclose the corona ring 5*c* (the corona ring 5*d* and the pressboard 7*d* not shown in the drawing are also the same).

The corona ring attached to the outside of the core is split into two and consists of corona rings 5*a*1, 5*a*2 attached to the top of the core 1 and corona rings 5*b*1, 5*b*2 (not shown) attached to the bottom of the core 1. The pressboard is not split and consists of the pressboard 7*a* attached to the top of the core 1 and the pressboard 7*b* (not shown) attached to the bottom of the core 1.

The corona rings 5*a*1, 5*b*1 are coupled by the arm 13*a*, and the corona rings 5*a*2, 5*b*2 are coupled by the arm 13*b*. These corona rings 5*a*1 to 5*b*2 are not in contact with the core 1 and supported by fixing the arms 13*a*, 13*b* to the boss 11 by the mounting member 14 in the same way as in the fourth embodiment.

The pressboards 7*a*, 7*b* are attached to the corona rings 5*a*1, 5*a*2, 5*b*1, 5*b*2 to enclose them.

In FIG. 12, the configuration of attachment of the corona rings 5*a*1, 5*a*2, 5*b*1, 5*b*2 by the mounting member 14 is the same as shown in FIG. 9, FIG. 10 and FIG. 11, and the sectional diagram taken along line J—J of FIG. 12 is the same as shown in FIG. 10(*b*).

As described above, the present invention provides the following effects.

(1) The core is in line contact with electric field easing members (corona rings), and a gap is formed between the core and the electric field easing members (corona rings), so that the pressboards between the core and the electric field easing members (corona rings) can be omitted. Therefore, it is not necessary to dispose the pressboards between the core and the electric field easing members (corona rings), and the service life of the wire-wound apparatus can be prevented from becoming short due to the degradation of the pressboards.

(2) The gap formed between the core and the corona rings allows having a cooling medium between the core and the corona rings, and the corona rings can be retarded from being heated. Therefore, the pressboards enclosing the core can be retarded from being heated by thermal conduction, and the pressboards disposed on the corona rings can be prevented from having a shortened service life.

What is claimed is:

1. A wire-wound apparatus which comprises:

a magnetic core having a magnetic alloy strip wound around the magnetic core tube;

a winding wound around the magnetic core;

electric field easing members for easing concentration of electric fields being arranged about the magnetic core and between the magnetic core and the winding;

a gap being provided at least between the electric field easing members and end surfaces in a widthwise direction of the magnetic alloy strip of the magnetic core; and a cooling medium being provided in the gap between the electric field easing members and the magnetic alloy strip; and the cooling medium contacting and directly cooling the electric field easing members, the magnetic alloy strip, and the magnetic core.

2. The wire-wound apparatus according to claim 1, wherein the electric field easing members only contact an edge of the magnetic core or magnetic alloy strip.

3. A high-full pulse generating circuit including a magnetic compression circuit, or the magnetic compression circuit and a step-up transformer circuit, wherein:

the wire-wound apparatus according to claim 1 is used as a saturable reactor disposed in the magnetic compression circuit or as a step-up transformer of the step-up transformer circuit.

4. A discharge pumped gas laser, comprising:

a pair of laser discharging electrodes disposed within a laser chamber and connected to output terminals of a high-voltage pulse generating circuit including a magnetic compression circuit, or the magnetic compression circuit and a step-up transformer circuit; and a peaking capacitor connected in parallel to the electrodes;

wherein the wire-wound apparatus according to claim 1 is used as a saturable reactor disposed in the magnetic compression circuit or as a step-up transformer of the step-up transformer circuit.

5. A wire-wound apparatus which comprises:

a magnetic core having a magnetic alloy strip wound around a magnetic core tube;

a winding wound around the magnetic core;

electric field easing members for easing concentration of electric fields being arranged about the magnetic core and between the magnetic core and the winding;

a gap being provided between the electric field easing members and the magnetic core, the gap being arranged in a widthwise direction of the magnetic alloy strip where at least a major portion of a surface of the electric field easing members facing the magnetic core does not contact the magnetic core; and a cooling medium being provided in the gap between the electric field easing members and the magnetic alloy strip; and the cooling medium contacting and directly cooling the electric field easing members, the magnetic alloy strip, and the magnetic core.

6. The wire-wound apparatus according to claim 5, wherein the electric field easing members only contact an edge of the magnetic core or magnetic alloy strip.

7. A high-full pulse generating circuit including a magnetic compression circuit, or the magnetic compression circuit and a step-up transformer circuit, wherein:

the wire-wound apparatus according to claim 5 is used as a saturable reactor disposed in the magnetic compression circuit or as a step-up transformer of the step-up transformer circuit.

8. A discharge pumped gas laser, comprising:

a pair of laser discharging electrodes disposed within a laser chamber and connected to output terminals of a high-voltage pulse generating circuit including a magnetic compression circuit, or the magnetic compression circuit and a step-up transformer circuit; and a peaking capacitor connected in parallel to the electrodes;

wherein the wire-wound apparatus according to claim 5 is used as a saturable reactor disposed in the magnetic compression circuit or as a step-up transformer of the step-up transformer circuit.

9. A wire-wound apparatus which comprises:

a magnetic core having a magnetic alloy strip wound around a magnetic core tube;

a magnetic alloy strip provided on the magnetic core;

a winding wound around the magnetic core;

electric field easing members for easing concentration of electric fields being arranged about the magnetic core and between the magnetic core and the winding;

a gap being provided between the electric field easing members and the magnetic core, the gap being arranged in a widthwise direction of the magnetic alloy strip and being formed by surfaces of the electric field easing members and the magnetic alloy core that face each other having different shapes; and a cooling medium being provided in the gap between the electric field easing members and the magnetic alloy strip; and the cooling medium contacting and directly cooling the electric field easing members, the magnetic alloy strip, and the magnetic core.

10. The wire-wound apparatus according to claim 9, wherein the electric field easing members only contact an edge of the magnetic core or magnetic alloy strip.

11. A high-full pulse generating circuit including a magnetic compression circuit, or the magnetic compression circuit and a step-up transformer circuit, wherein:

the wire-wound apparatus according to claim 9 is used as a saturable reactor disposed in the magnetic compression circuit or as a step-up transformer of the step-up transformer circuit.

12. A discharge pumped gas laser, comprising:

a pair of laser discharging electrodes disposed within a laser chamber and connected to output terminals of a high-voltage pulse generating circuit including a magnetic compression circuit, or the magnetic compression circuit and a step-up transformer circuit; and a peaking capacitor connected in parallel to the electrodes;

wherein the wire-wound apparatus according to claim 9 is used as a saturable reactor disposed in the magnetic compression circuit or as a step-up transformer of the step-up transformer circuit.

* * * * *